(12) United States Patent
Joiner et al.

(10) Patent No.: US 10,489,423 B2
(45) Date of Patent: Nov. 26, 2019

(54) MOST-RELEVANT-FIRST CALENDAR EVENT SYNCHRONIZATION

(71) Applicant: Microsoft Technology Licensing, LLC, Redmond, WA (US)

(72) Inventors: Sara Rouelle Joiner, Bellevue, WA (US); Jaskaran Singh, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 231 days.

(21) Appl. No.: 15/396,018

(22) Filed: Dec. 30, 2016

(65) Prior Publication Data
US 2018/0189372 A1 Jul. 5, 2018

(51) Int. Cl.
*G06F 16/27* (2019.01)
*G06Q 10/06* (2012.01)
*G06Q 10/10* (2012.01)
*H04L 29/08* (2006.01)

(52) U.S. Cl.
CPC ............ *G06F 16/275* (2019.01); *G06F 16/27* (2019.01); *G06Q 10/06314* (2013.01); *G06Q 10/10* (2013.01); *G06Q 10/1093* (2013.01); *H04L 67/1095* (2013.01)

(58) Field of Classification Search
CPC ........ G06F 17/30581; G06F 17/30575; G06Q 10/1093
See application file for complete search history.

(56) References Cited

U.S. PATENT DOCUMENTS

| | | | |
|---|---|---|---|
| 6,671,757 B1 | 12/2003 | Multer et al. | |
| 9,367,599 B2 | 6/2016 | Palay et al. | |
| 9,460,141 B1* | 10/2016 | Coman | G06F 17/30345 |
| 2003/0041076 A1 | 2/2003 | Lucovsky et al. | |
| 2005/0203971 A1 | 9/2005 | Koskimies et al. | |
| 2007/0299972 A1 | 12/2007 | Brake et al. | |
| 2009/0307375 A1 | 12/2009 | Mccarthy | |
| 2011/0208697 A1 | 8/2011 | Ramanujam | |
| 2014/0156597 A1* | 6/2014 | Hakami | G06F 17/30575 707/634 |
| 2015/0120662 A1* | 4/2015 | Dai | G06F 17/30575 707/634 |

(Continued)

FOREIGN PATENT DOCUMENTS

| | | |
|---|---|---|
| EP | 1976234 A1 | 10/2008 |
| EP | 2377362 A2 | 10/2011 |
| WO | 0244977 A1 | 6/2002 |

OTHER PUBLICATIONS

"International Search Report and Written Opinion Issued in PCT Application No. PCT/US2017/068061", dated Mar. 2, 2018, 10 Pages.

(Continued)

*Primary Examiner* — Hosain T Alam
*Assistant Examiner* — Anthony G Gemignani
(74) *Attorney, Agent, or Firm* — Merchant & Gould (57) ABSTRACT

To improve the responsiveness of a user device during a synchronization of a local calendar with a master calendar, the master calendar will provide the most-relevant events, relative to the current time, first to the user device. The user device is thus enabled to display those most-relevant events to the user.

19 Claims, 7 Drawing Sheets

(56) References Cited

U.S. PATENT DOCUMENTS

| | | | |
|---|---|---|---|
| 2015/0127734 A1* | 5/2015 | Fukuda | H04N 21/252 709/204 |
| 2015/0326483 A1* | 11/2015 | Granlund | H04L 47/14 370/236 |
| 2016/0198307 A1 | 7/2016 | Cooper et al. | |
| 2016/0261613 A1* | 9/2016 | Farmer | G06Q 10/06 |

OTHER PUBLICATIONS

"Google Calendar API", https://developers.google.com/google-apps/calendar/v3/sync, Published on: Jul. 26, 2016, 5 pages.

"Asana Guide : Calendars & Asana", https://asana.com/guide/help/api/calendar-sync, Retrieved on: Nov. 15, 2016, 16 pages.

* cited by examiner

MOST-RELEVANT-FIRST CALENDAR EVENT SYNCHRONIZATION

BACKGROUND

When synchronizing a calendar application so that the events shown in the calendar applications of multiple devices include equivalent events, users often experience processing lag, especially when the number of events to synchronize is large. This processing lag, aside from being annoying to the user, often prevents the user from accessing the calendaring application or other applications until the synchronization is complete; leaving the user staring at a blank current time-frame in a calendar for a long period of time until that time-frame is populated or locking the device to deal with the synchronization operation.

SUMMARY

This summary is provided to introduce a selection of concepts in a simplified form that are further described below in the Detailed Description section. This summary is not intended to identify all key or essential features of the claimed subject matter, nor is it intended as an aid in determining the scope of the claimed subject matter.

Systems and methods are discussed herein to provide an improved synchronization operation for electronic calendaring services, with reduced wait times to provide relevant event data and reduced lock-ups for the devices being synchronized. In one aspect, the improvements are made available as an API (Application Program Interface) for syncing events on a calendar that will return the most relevant events to the user first (e.g. through syncing the first month of data before the rest of the calendar). By providing the events of greatest relevance first, a better user experience is provided since the applications do not have to wait for the entire set of events to load before showing the calendar to the user. With this improvement, the calendar application will automatically query for and return events occurring in the current time-frame first, followed by any events after the current time-frame and any events before it. This allows clients to obtain the information that is typically most interesting first, instead of having to wait for the entire synchronization to complete before the calendar interface is made available; enabling the calendar application to asynchronously start displaying the first time-frame of data while continuing the synchronization in the background, providing a more responsive user experience.

Examples are implemented as a computer process, a computing system, or as an article of manufacture such as a device, computer program product, or computer readable medium. According to an aspect, the computer program product is a computer storage medium readable by a computer system and encoding a computer program comprising instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Figure 1:
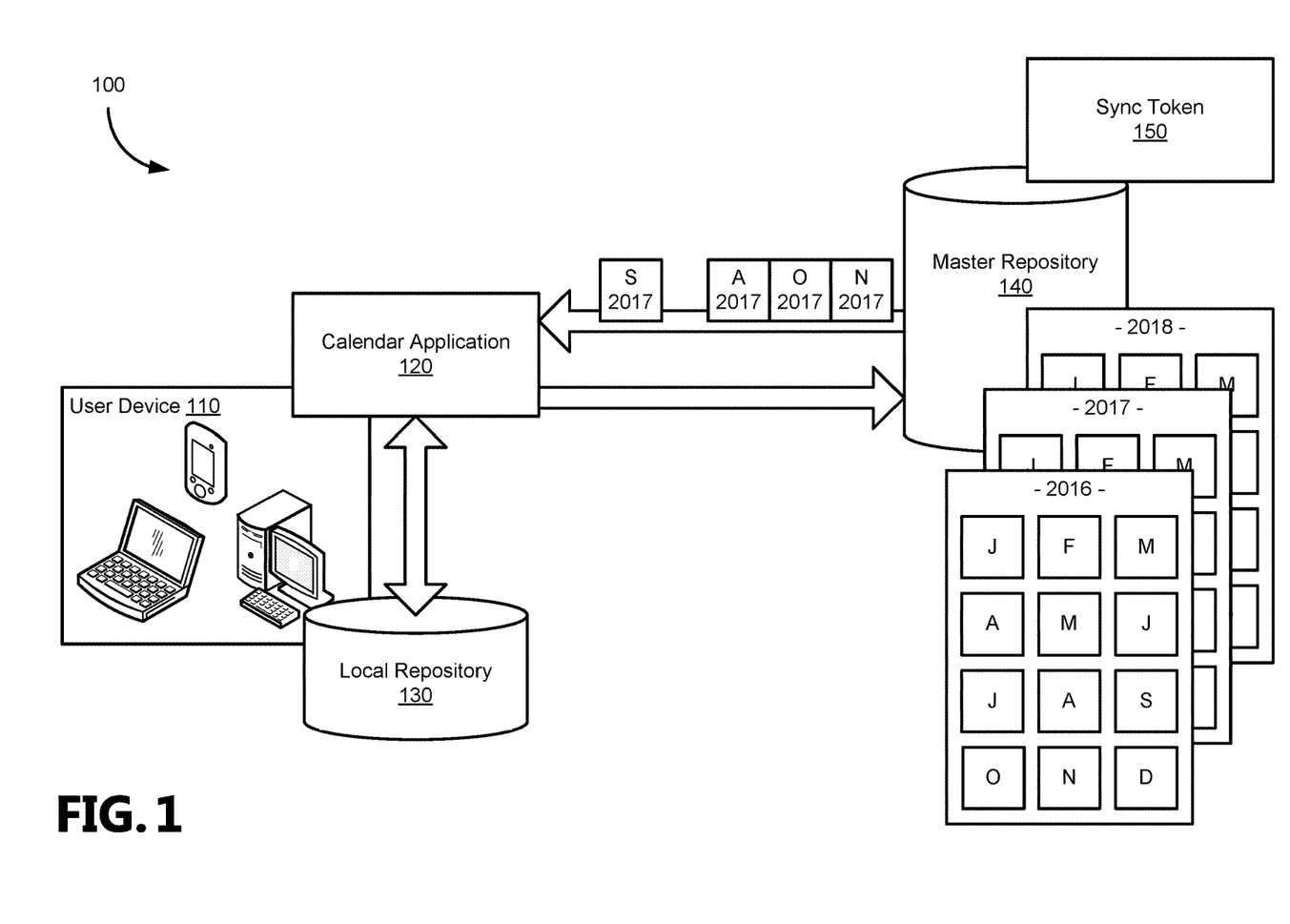
FIG. 1 is an example operating environment in which the present disclosure may be practiced.

FIG. 1 is an example operating environment 100 in which the present disclosure may be practiced. As illustrated, a user device 110 runs a calendar application 120 that stores events in a local repository 130. The user device 110 is in communication with a master repository 140 that stores the events that will be synchronized, via the calendar application 120, to the local repository 130 for use by the calendar application 120. The calendar application 120 transmits a sync request to the master repository 140, which first returns a subset of the events that it contains for a most-relevant time-frame, thus enabling the calendar application 120 to display the events in that time-frame and sync the other time-frames to the user device 110 as a background process. Although the examples given herein primarily use a one-month time-frame, it will be appreciated that time-frames of other durations (e.g., a week, thirty-days, a quarter) are envisioned by the present disclosure.

The user device 110 and the master repository 140 are illustrative of a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, printers, and mainframe computers. The hardware of these computing systems is discussed in greater detail in regard to FIGS. 4-6.

While the user device 110 and master repository 140 are shown remotely from one another for illustrative purposes, it should be noted that several configurations of one or more of these devices hosted locally to another illustrated device are possible, and each illustrated device may represent multiple instances of that device. Various servers and intermediaries familiar to those of ordinary skill in the art may lie between the component systems illustrated in FIG. 1 to route the communications between those systems, which are not illustrated so as not to distract from the novel aspects of the present disclosure.

The calendar application 120 provides events, including meetings, appointments, contact information (e.g., an address book), availability sharing, and reminders across various time-frames for a variety of users. For example, an individual user may load events that are personally relevant into a calendar application 120 to track when those events occur. In another example, a family of several users may load events that are relevant to individual (or several) family members into a calendar application 120 to track events occurring for one another. To illustrate, if Alice has soccer practice on Monday evenings on her calendar, and if Bob has swim practice on Tuesday mornings of his calendar, the parents of Alice and Bob may, in addition to Alice and Bob, see their calendars to coordinate family activities while still separating events for different individuals. Examples of calendar applications 120 include, but are not limited to: OUTLOOK® (available from Microsoft Corp. of Redmond, Wash.), GOOGLE CALENDAR™ (available from Alphabet, Inc. of Mountain View, Calif.), or CALENDAR (available from Apple, Inc. of Cupertino, Calif.). In various aspects, the calendar application 120 may include an email application or productivity suite (or be included in an email application or productivity suite).

The events presented to the user by the calendar application 120 are stored in the local repository 130. In various aspects, such as when the user device 110 is first activated for a given user, the local repository 130 may contain no events for the given user. The user is able to, via the calendar application 120, manually add events to the local repository 130, but may also request a synchronization of calendar information via the calendar application 120 between the master repository 140 and the local repository 130 so that the events available for presentation to the user are consistent across multiple user devices 110. For example, a user may check a personal calendar while working on a desktop computer (a first user device 110) while in the office, and check the same personal calendar while traveling via a mobile device (a second user device 110). In some aspects, the master repository 140 is hosted by a central server (e.g., a cloud calendaring service, an enterprise service) or a given user device 110 is designated as having its local repository 130 act as the master repository 140 (e.g., a family personal computer acting as the master repository 140 for several smart phone user devices 110).

To keep the event data available on different user devices 110 consistent, the data are synchronized between a master repository 140 and the local repositories 130 of each user device 110. Event data are uploaded from the user device 110 to the master repository 140 for events (or updates thereto) that are not present in the master repository 140. Similarly, event data are downloaded to the user device 110 from the master repository 140 for events (or updates thereto) that are not present in the local repository 130. A sync token 150 is maintained for the user device 110 on the master repository 140 to track the last time the user device 110 has been synchronized with the master repository 140 and the event data that it has received.

In response to receiving a synchronization request from a user device 110, the master repository 140 determines, according to the sync token 150, what events have been previously synchronized and what events still need to be synchronized.

The present disclosure describes systems and methods to improve the functionality of the user device 110 and the master repository 140 in handling the transfer of a large amount of event data when synchronizing calendars. These transfers of large amounts of event data may occur during an initial synchronization request or later synchronization requests, and may put the user device 110 at risk of locking up due to the amount of data being handled.

As described herein, an initial synchronization request occurs when the local repository 130 of a given user device 110 has not previously been synchronized with a given master repository 140 to which it is being synchronized. In various aspects during an initial synchronization, the local repository may contain no events or data for events that have been locally added to the user device 110, which have not been communicated to the given master repository 140. As will be appreciated, a significant amount of event data may be transferred between the master repository 140 and the local repository 130 in response to an initial synchronization request, for example, several years of event data may be stored for a given user in the master repository 140. As will be apparent, the non-initial synchronizations (particularly if there is a long period of time since a prior synchronization) may also pose a risk of locking a user device 110, and are therefore also handled according to the present disclosure to improve functionality of the user device 110 and master repository 140 regardless of the amount of data that is actually transferred between the local repository 130 and the master repository 140.

To handle a potentially large calendar synchronization and still provide a responsive view of the current time-frame of calendar to the user, such as in an initial synchronization or a synchronization occurring a long time after the last-executed synchronization, example methods 200 and 300 (illustrated in FIGS. 2 and 3 respectively) for synchronizing a calendar may be performed. The events that occur in the most-relevant time-frame are provided from the master repository 140 first to the user device 110, to enable the user device 110 to display those events in the calendar application 120 to the user while the rest of the calendar is synchronized for the less-relevant events that occur outside of the time-frame.

In some aspects, the time-frame is based on the current time at which the sync request is made, and the events that happen temporally closer (in the future or the past) to the current time will be synchronized first and events happening further away will be synchronized later. In additional aspects, the time-frame may be weighted to the past, to the future, or evenly to the past and future relative to the current day. For example, a future-weighted 30-day time-frame may return events occurring twenty days in the future from the current day, on the current day, and nine days in the past from the current day. In contrast, a past-weighted 30-day time-frame may return events occurring twenty days in the past from the current day, on the current day, and nine days in the past from the current day.

As illustrated in FIG. 1, several years of events are stored for a user in the master repository 140, which are being synchronized to the local repository 130 on the user device 110 based on the current time. For example, if the user were to request a synchronization in September of 2017, the event data set for events occurring in September 2017 are returned first for display in the calendar application 120. After these September 2017 event data are received, the master repository 140 may provide the remaining event data according to one or more schemes. In various aspects, these schemes include, but are not limited to: forward or reverse chronologically according to the scheduled time of the events, forward or reverse chronologically according to the time the events were stored in the master repository 140, based on a proximity to the current time-frame (e.g., providing event data for August 2017 and October 2017 after event data for September 2017 is provided).

Figure 2:
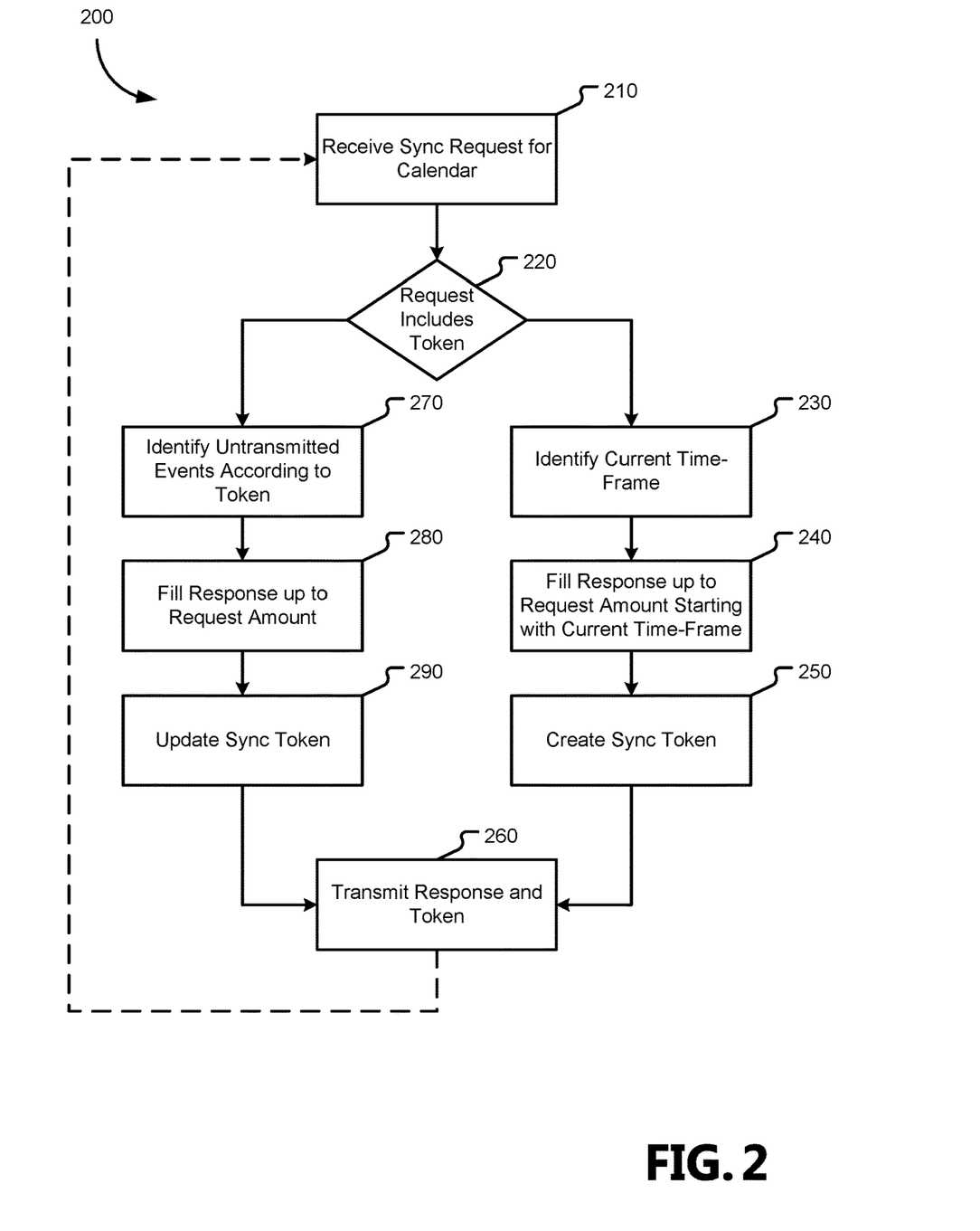
FIG. 2 is a flow chart showing general stages involved in an example method for synchronizing a calendar from the perspective of the master repository.

FIG. 2 is a flow chart showing general stages involved in an example method for synchronizing a calendar from the perspective of the master repository 140. Method 200 begins at OPERATION 210, where a sync request for a calendar is received from a user device 110 by the master repository 140. The sync request includes credentials for the user(s) for whom the events are requested, and specifies a number of event items to receive at a given time (e.g., return up to n of the available event items). In various aspects, the sync request is un-windowed; the user device 110 does not specify a window of time for which to request events in. For example, a windowed sync request may specify "return all events occurring between time X and time Y for user Z", whereas an un-windowed request may specify "return all events for user Z" and is automatically handled to return the most relevant (in respect to a current date) events first.

At DECISION 220, it is determined whether the request includes a valid sync token 150. Method 200 will proceed to OPERATION 230 when a sync token 150 is not included in the request, such as with an initial sync request (where a sync token 150 is not available to the user device 110) or when the user device 110 omits the sync token 150. In various aspects, it may be determined to ignore a sync token 150 included in the request or treat it as invalid, and proceed to OPERATION 230, when the sync token 150 satisfies an expiration date. Method 200 provides an incremental synchronization with the most-relevant events provided first to the user device 110 both for an initial synchronization of the user device 110 as well as later synchronizations that may include a large number of differences between the events stored in the local repository 130 and the master repository 140. For example, if a user were to sync a calendar on a user device 110 infrequently (e.g., once a year), the amount of event data needed to satisfy the gap in events since the last update might induce latency in the user seeing the most recent events were the sync token 150 to be treated as valid. In response to determining that the sync request includes a valid sync token 150, however, method 200 proceeds to OPERATION 270.

At OPERATION 230 the master repository 140 identifies and loads the calendar view at the current time-frame. The current time-frame is based on the current time at which the sync request is received. In various aspects, the length of the current time-frame may vary, and how the current time-frame is weighted relative to the past or the future may also vary depending on the settings of the master repository 140. In a first example, a current time-frame may specify that all events within the current month are to be returned. In a second example, a current time-frame specifies that events occurring x days ahead of the current date and y days prior to the current date (as well as those occurring on the current date) are to be returned, where x and y may be varied relative to one another to provide for more events occurring after or before the current date. For example, for a four-week time-frame, the events occurring in the one week prior to the current date and the three weeks occurring after the current date comprise the time-frame; future weighting the time-frame. In a converse example of a four-week time-frame that is past-weighted, the events occurring in the one week after the current date and the three weeks occurring prior to the current date comprise the time-frame. In another example, the time-frame may be weighted by a number of events discovered in the past or the future, such as, to return the x events occurring before the current time and the y events occurring after the current time, where x and y may be weighted relative to one another to apply to apply various past/future weightings.

Method 200 proceeds to OPERATION 240, where a response to the sync request is populated based on the events discovered in the current time-frame. In various aspects, the user device 110 or the master repository 140 may specify a request amount for an upper bound on the number of events to be returned in response to the sync request. For example, the user device 110 may specify in the sync request for no more than n events to be returned at one time. In various aspects, if the number of events within the current time-frame is less than the request amount, events from outside of the current-time frame are included in the first response. In other aspects, the first response may be limited to events occurring within the current time-frame, even when the number of events is less than the request amount. In aspects where the number of events within the current time-frame exceeds the request amount, a number of events up to the request amount (which may be a "hard" or a "soft" limit) are provided in the first response, and a sync token 150 is generated that indicates that the remaining events within the current time-frame are to be prioritized for transmission in a subsequent response to synchronize the calendar on the user device 110.

At OPERATION 250, a sync token 150 is generated for the user account and the user device 110. As will be appreciated, a given user may use more than one user device 110 (e.g., a mobile device and a desktop device), and more than one user may use a given user device 110 (e.g., a shared workstation), therefore the sync token 150 is associated with both a user (whose calendar is being synchronized) and a user device 110 (to which the calendar is being synchronized).

The sync token 150 flags where a synchronization operation has left off so that a subsequent sync request can resume from a prior sync request. For example, when a user has one hundred events stored in the master repository 140 and the request amount is for sixty events, the sync token 150 flags, after a first response, where the sync process left off so that the remaining forty events can be identified as still being un-synchronized with the local repository 130. In some aspects, the sync token 150 uses a timestamp (for event occurrence) or pointer to the last-synchronized event or next-unsynchronized event to enable the master repository 140 to resume the synchronization process from where it left off. In another example, a sync token 150 is generated when all of the events from the master repository 140 are included in the response, so that the next time a sync request is received, only changes (additions, reschedulings, etc.) to the user's calendar will be transmitted to the user device 110; reducing the amount of data needed to be transmitted.

Proceeding to OPERATION 260, the response to the sync request and the sync token 150 are transmitted by the master repository 140 to the user device 110. Method 200 may conclude after OPERATION 260 or continue by returning OPERATION 210 in response to receiving a continuation sync request from the user device 110 that includes the sync token 150 and request the events that were not included in the prior responses.

Method 200 proceeds to OPERATION 270 from DECISION 220 in response to determining that the sync request includes a valid sync token 150 (e.g., is a continuation sync request) to identify untransmitted events according to the sync token 150. In various aspects, when the events occurring in the current time-frame have not been fully transmitted to the user device 110, the events occurring during the current time-frame are prioritized for identification and inclusion in the continuation response. In aspects where the events occurring during the current time-frame have been fully transmitted to the user device 110, event identification may be managed according to the scheduled times of the remaining events, the times at which the remaining events were added to the master repository 140, or a temporal proximity of the scheduled times of the remaining events to the current time-frame (e.g., the closest events in time to the most-relevant events), as well as other identification schemes.

At OPERATION 280, the response for continued synchronization is populated based on the events discovered in OPERATION 270. As the master repository 140 allows for piecewise synchronization according to the request amount, the continuation responses may be one of a series of continuation responses that synchronize the master repository 140 with the local repository 130 over multiple rounds of requests and responses.

Proceeding to OPERATION 290, the sync token 150 is updated in light of the events included in the continuation response to provide the user device 110 with the most-relevant events first and thereby enable the master repository 140 to resume synchronization with the user device 110 for the user in response to a subsequent sync request.

Figure 3:
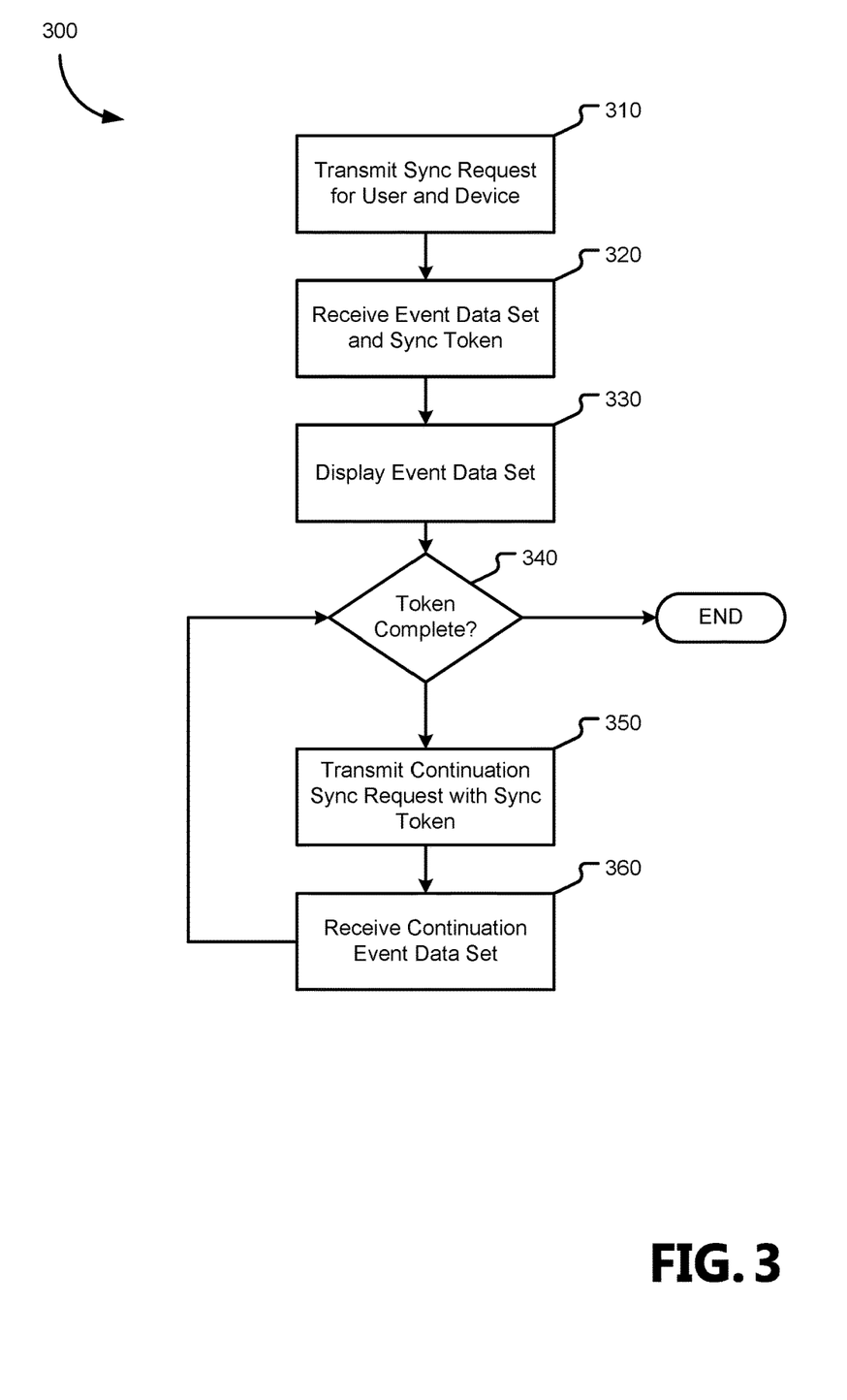
FIG. 3 is a flow chart showing general stages involved in an example method for synchronizing a calendar from the perspective of the user device.

FIG. 3 is a flow chart showing general stages involved in an example method 300 for synchronizing a calendar from the perspective of the user device 110. Method 300 begins with OPERATION 310, where a sync request is transmitted from the user device 110 to the master repository 140. The sync request identifies the user device 110 and the user whose calendar of events are to be synchronized with the master repository 140. In various aspects, the sync request also includes a request amount, specifying an upper bound on the number of events to be returned in response to the sync request, while in other aspects, a system-defined number is used for the request amount. In some aspects, the user device 110 may transmit to the master repository 140 any events in the local repository 130, such as, for example, events manually added to the local repository 130 by the user prior to requesting the calendar synchronization. In additional aspects, in which the sync request is not an initial sync request, the sync request may include a sync token 150 from a prior synchronization.

At OPERATION 320 the user device 110 receives a data set for the events that occur during the time-frame deemed most relevant to the user based on the current time up to the request amount and a sync token 150. These received most-relevant events are displayed to the user in the calendar application 120 at OPERATION 330, and at DECISION 340 it is determined whether the sync token 150 indicates that there are more events on the master repository 140 that need to be synchronized to the local repository 130.

When it is determined at DECISION 340 that the sync token 150 indicates that the synchronization is complete and the local repository 130 and the master repository 140 share the same set of events, method 300 may conclude. Similarly, after receiving one or more responses from the master repository 140, method 300 may conclude and resume from OPERATION 310 or OPERATION 350, such as, for example, when the user device 110 loses connectivity to the master repository 140 or the user aborts the synchronization process early.

Method 300 proceeds to OPERATION 350 in response to the sync token 150 indicating that there are additional events stored on the master repository 140 that have not been transmitted and stored in the local repository 130. At OPERATION 350, a continuation sync request is transmitted to the master repository 140 that includes the sync token 150. A continuation sync request continues the synchronization process from a prior sync request by including the sync token 150, which is interpretable by the master repository 140 to determine which events that have not been transmitted from the event data set for the given user and user device 110 are to be transmitted in the next request/response pair. The continuation request does not need to specify a time window in which to request event data for; sync requests are non-windowed according to aspects.

In response to transmitting the continuation sync request, the user device 110 receives a continuation response at OPERATION 360 that includes additional event data from the master repository 140 and an updated sync token 150. The events are stored in the local repository 130, and in aspects in which the event data include additional events that occur during the current time-frame for the most-relevant events, they are displayed in the calendar application 120. The user device 110 adds the received events data to the local repository 130, and in some aspects where the events received are from outside of the current time-frame, the user device 110 handles storing the events as a background process requiring no further user interaction. Method 300 then returns to DECISION 340 to determine whether the updated sync token 150 indicates that an additional continuation is needed.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
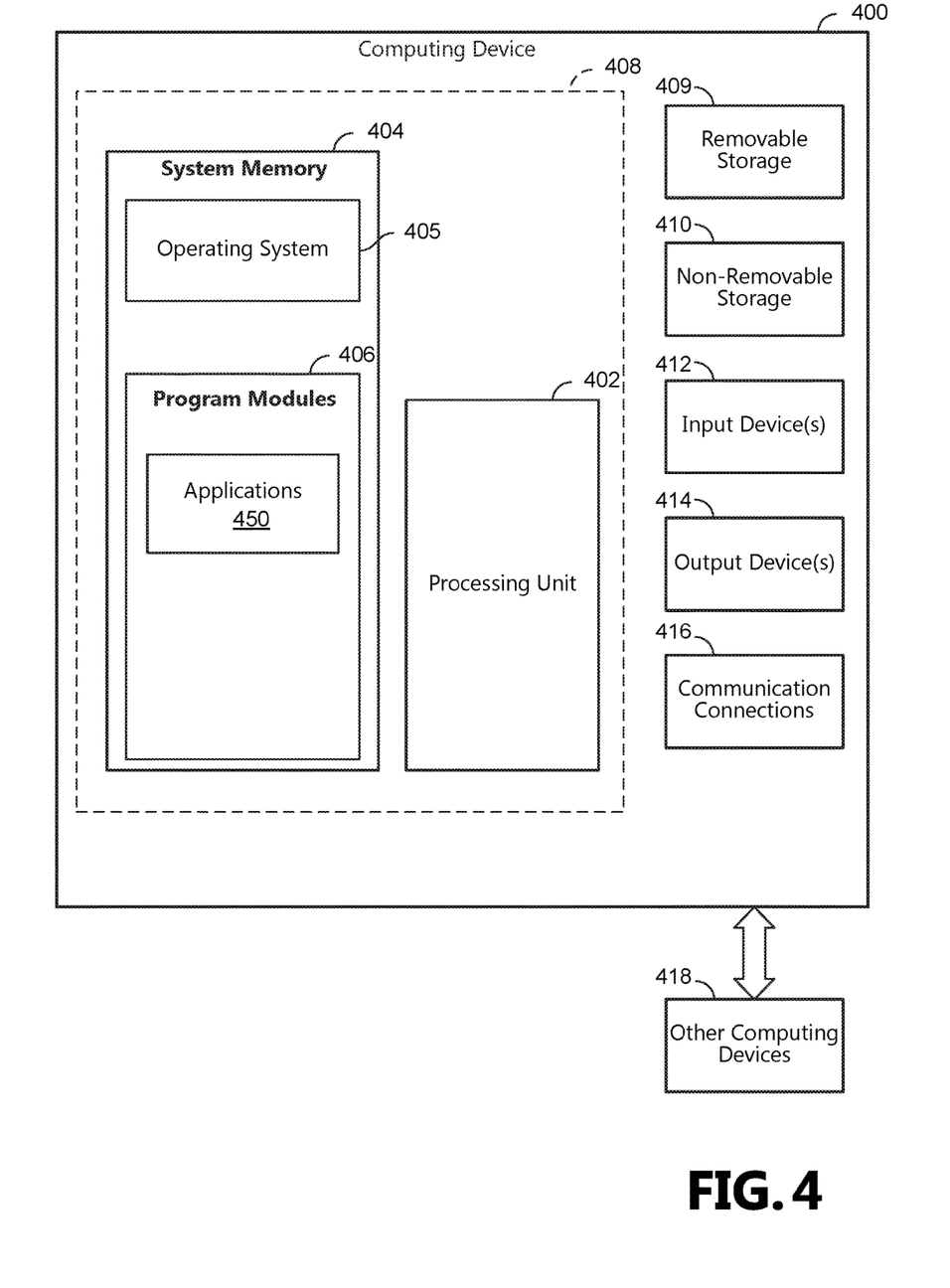
FIG. 4 is a block diagram illustrating example physical components of a computing device.
Figure 5A:
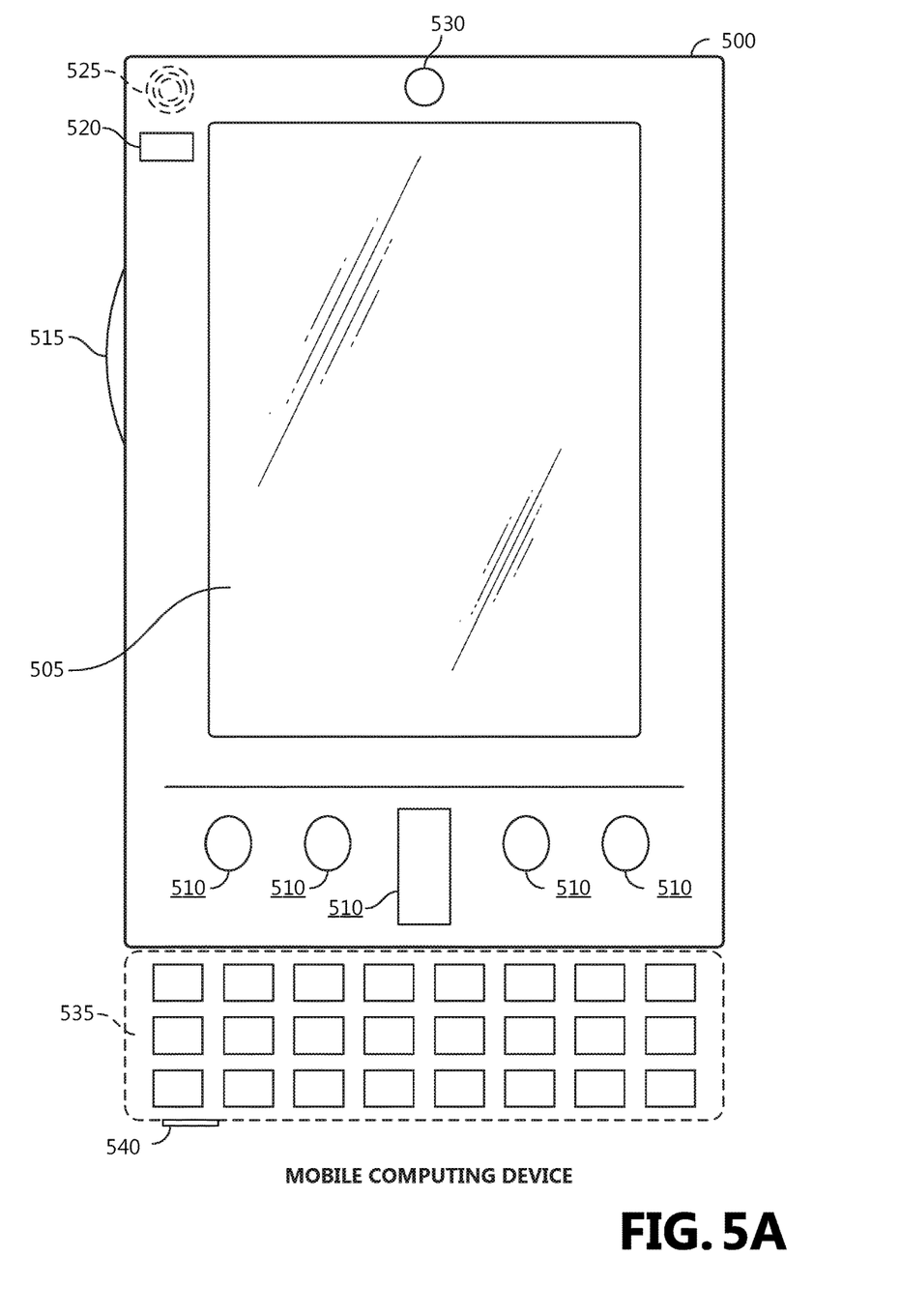
FIGS. 5A and 5B are block diagrams of a mobile computing device.
Figure 5B:
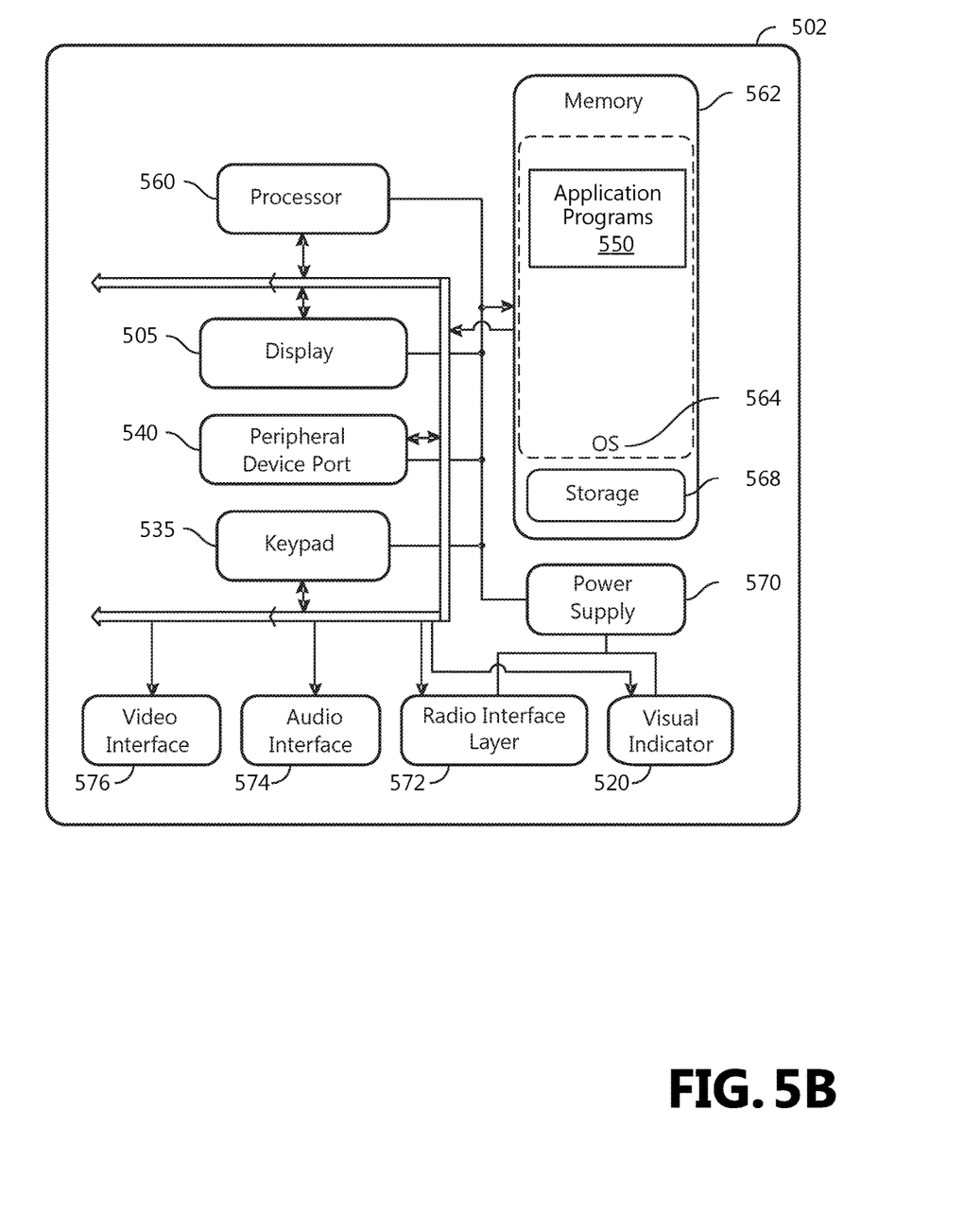
Figure 6:
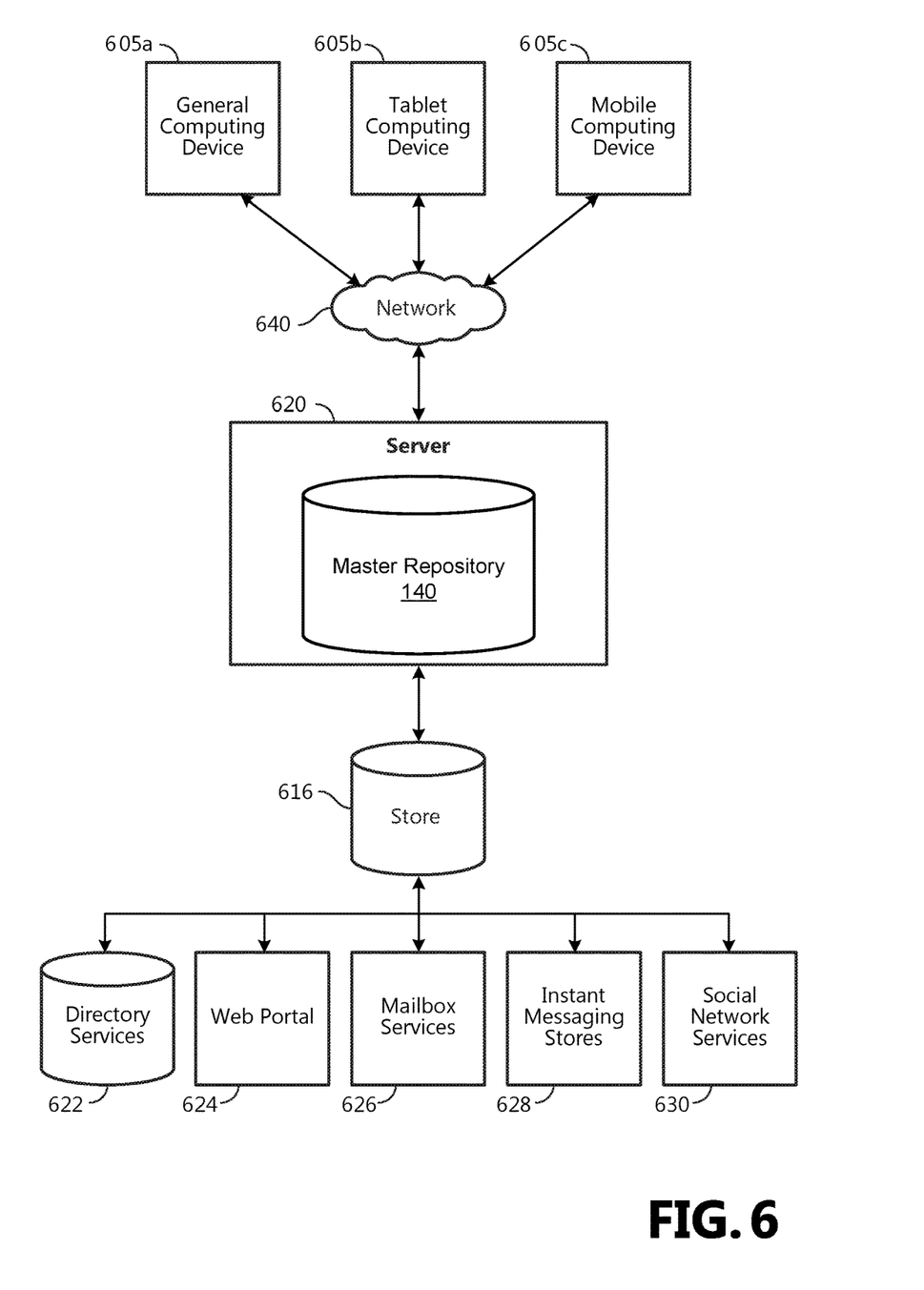
FIG. 6 is a block diagram of a distributed computing system.

FIGS. 4-6 and the associated descriptions provide a discussion of a variety of operating environments in which examples are practiced. However, the devices and systems illustrated and discussed with respect to FIGS. 4-6 are for purposes of example and illustration and are not limiting of a vast number of computing device configurations that are utilized for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the software applications 450 include an API to enable the handling of event data synchronization as described herein. The operating system 405, for example, is suitable for controlling the operation of the computing device 400. Furthermore, aspects are practiced in conjunction with a graphics library, other operating systems, or any other application program, and are not limited to any particular application or system. This basic configuration is illustrated in FIG. 4 by those components within a dashed line 408. According to an aspect, the computing device 400 has additional features or functionality. For example, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 perform processes including, but not limited to, one or more of the stages of the method 200 illustrated in FIG. 2. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, radio frequency (RF) transmitter, receiver, and/or transceiver circuitry; universal serial bus (USB), parallel, and/or serial ports.

The term computer readable media, as used herein, includes computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage media is part of the computing device 400. Computer storage media do not include a carrier wave or other propagated data signal.

According to an aspect, communication media are embodied by computer readable instructions, data structures, program modules, or other data in a modulated data signal, such as a carrier wave or other transport mechanism, and include any information delivery media. According to an aspect, the term "modulated data signal" describes a signal that has one or more characteristics set or changed in such a manner as to encode information in the signal. By way of example, and not limitation, communication media include wired media such as a wired network or direct-wired connection, and wireless media such as acoustic, radio frequency (RF), infrared, and other wireless media.

FIGS. 5A and 5B illustrate a mobile computing device 500, for example, a mobile telephone, a smart phone, a tablet personal computer, a laptop computer, and the like, with which aspects may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or fewer input elements. For example, the display 505 may not be a touch screen in some examples. In alternative examples, the mobile computing device 500 is a portable phone system, such as a cellular phone. According to an aspect, the mobile computing device 500 includes an optional keypad 535. According to an aspect, the optional keypad 535 is a physical keypad. According to another aspect, the optional keypad 535 is a "soft" keypad generated on the touch screen display. In various aspects, the output elements include the display 505 for showing a graphical user interface (GUI), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 500 incorporates peripheral device port 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA) and wireless phone.

According to an aspect, one or more application programs 550 are loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. According to an aspect, an API configured to enable the handling of event data synchronization as described herein is loaded into an application program 550. The system 502 also includes a non-volatile storage area 568 within the memory 562. The non-volatile storage area 568 is used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries. According to an aspect, the power supply 570 further includes an external power source, such as an AC adapter or a powered docking cradle that supplements or recharges the batteries.

According to an aspect, the system 502 includes a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

According to an aspect, the visual indicator 520 is used to provide visual notifications and/or an audio interface 574 is used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. According to an aspect, the system 502 further includes a video interface 576 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 are stored locally on the mobile computing device 500, as described above. According to another aspect, the data are stored on any number of storage media that are accessible by the device via the radio 572 or via a wired connection between the mobile computing device 500 and a separate computing device associated with the mobile computing device 500, for example, a server computer in a distributed computing network, such as the Internet. As should be appreciated such data/information are accessible via the mobile computing device 500 via the radio 572 or via a distributed computing network. Similarly, according to an aspect, such data/information are readily transferred between computing devices for storage and use according to well-known data/information transfer and storage means, including electronic mail and collaborative data/information sharing systems.

FIG. 6 illustrates one example of the architecture of a system for syncing calendars as described above. Content developed, interacted with, or edited in association with the calendar application 120 is enabled to be stored in different communication channels or other storage types. For example, various event data may be stored using a directory service 622, a web portal 624, a mailbox service 626, an instant messaging store 628, or a social networking site 630. The calendar application 120 is operative to use any of these types of systems or the like when syncing calendars, as described herein. According to an aspect, a server 620 provides the an API for calendar synchronization to clients 605a,b,c. As one example, the server 620 is a web server providing the master repository 140 over the web to clients 605 through a network 640. By way of example, the client computing device is implemented and embodied in a personal computer 605a, a tablet computing device 605b or a mobile computing device 605c (e.g., a smart phone), or other computing device. Any of these examples of the client computing device are operable to obtain content from the store 616.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A method for synchronizing calendars, comprising:
receiving, from a user device at a master repository, an initial sync request to synchronize an entirety of events stored in the master repository to the user device, wherein the initial sync request specifies a user and a number of events to be transmitted per response;
performing an initial synchronization responsive to the initial sync request by:
identifying a current time-frame;
identifying a portion of the events stored in the master repository that occur during the current time-frame;
populating a response with the portion of the events up to the specified number of events;
as a remaining portion of the events stored in the master repository that occur outside of the current time-frame are being identified, transmitting the response from the master repository to the user device, wherein the transmission of the response causes display of the portion of the events in a calendar application of the user device while the initial synchronization is still being performed;
populating an additional response with the remaining portion of the events up to the specified number of events, wherein the additional response is populated chronologically according to one of when the remaining portion of the events are scheduled to occur and when the remaining portion of the events were stored in the master repository; and
transmitting the additional response from the master repository to the user device along with a sync token that identifies a completion status of the initial synchronization.

2. The method of claim 1, further comprising:
receiving a continuation sync request from the user device at the master repository, the continuation sync request including the user, the number of events to be transmitted per response, and the sync token identifying the completion status of the initial synchronization; and
performing a continued synchronization responsive to the continuation sync request by:
identifying, according to the sync token, unsynchronized events stored in the master repository;
populating a continuation response with the unsynchronized events up to the specified number of events;
updating the sync token to identify a current status of the continued synchronization based on the continuation response; and
transmitting the continuation response and the updated sync token from the master repository to the user device.

3. The method of claim 2, wherein the continuation response is one of a series of continuation responses transmitted to the user device for piecewise synchronization according to the specified number of events.

4. The method of claim 2, wherein the continuation response is populated with the unsynchronized events stored in the master repository chronologically according to when the unsynchronized events are scheduled to occur.

5. The method of claim 2, wherein the continuation response is populated with the unsynchronized events stored in the master repository chronologically according to when the unsynchronized events were stored in the master repository.

6. The method of claim 1, wherein the current time-frame is future-weighted, in which a greater amount of the current time-frame specifies times for events occurring after a current date and a lesser amount of the current time-frame specifies time for events occurring prior to the current date.

7. The method of claim 1, wherein the current time-frame is past-weighted, in which a greater amount of the current time-frame specifies times for events occurring before a current date and a lesser amount of the current time-frame specifies time for events occurring after the current date.

8. The method of claim 1, wherein if a number of the portion of the events stored in the master repository that occur during the current time-frame is more than the specified number of events, events up to the specified number of events are included in the response and remaining events are included in the additional response.

9. The method of claim 1, wherein if a number of the portion of the events stored in the master repository that occur during the current time-frame is less than the specified number of events, the remaining portion of the events stored in the master repository that occur outside of the current time-frame are identified and included in the response to meet the specified number of events.

10. A method for synchronizing calendars, comprising:
transmitting, to a master repository of calendar events from a user device, an initial sync request to synchronize an entirety of the calendar events stored in the master repository to a local repository of calendar events on the user device, wherein upon receipt the master repository performs an initial synchronization responsive to the initial sync request;
in response to transmitting the initial sync request but before the initial synchronization is complete, receiving a first event data set that includes a portion of the calendar events stored in the master repository that occur during a current time-frame;
adding the first event data set to the local repository;
displaying the first event data set in a calendar application of the user device while the initial synchronization is still being performed at the master repository to identify a remaining portion of the calendar events stored in the master repository that occur outside of the current time-frame;
receiving a second event data set that includes the remaining portion of the calendar events and a sync token that identifies a completion status of the initial synchronization, wherein the second event data set is populated by the master repository chronologically according to one of when the remaining portion of the events are scheduled to occur and when the remaining portion of the events were stored in the master repository;
determining, based on the sync token, whether to send a continuation sync request; and
in response to determining to send the continuation sync request:

transmitting, to the master repository from the user device, the continuation sync request including the sync token;

in response to transmitting the continuation sync request, receiving a continuation event data set and an updated sync token; and adding the continuation event data set to the local repository.

11. The method of claim 10, wherein the initial sync request and the continuation sync request are non-windowed.

12. The method of claim 10, wherein the master repository expires the sync token according to an expiration date included in the sync token.

13. The method of claim 10, wherein transmitting the continuation sync request, receiving the continuation event data set, and adding the continuation event data set to the local repository are run as background processes on the user device.

14. The method of claim 10, wherein the continuation event data set is part of a series of continuation data sets, wherein the user device continues to determine whether to transmit additional continuation sync requests and receive additional continuation event data sets and additional updated sync tokens in response based on the updated sync tokens indicating that the master repository includes calendar events that have not yet been transmitted to the user device.

15. The method of claim 10, wherein locally added calendar events in the local repository are transmitted to the master repository.

16. A computer readable storage device including instructions for synchronizing calendars that when executed by a processor comprise:

receiving, from a user device at a master repository, an initial sync request to synchronize an entirety of events stored in the master repository to the user device, wherein the initial sync request specifies a user and a number of events to be transmitted per response;

performing an initial synchronization responsive to the initial sync request by:

identifying a current time-frame;

identifying a portion of the events stored in the master repository that occur during the current time-frame;

populating a response with the portion of the events up to the specified number of events;

as a remaining portion of the events stored in the master repository that occur outside of the current time-frame are being identified, transmitting the response from the master repository to the user device, wherein the transmission of the response causes display of the portion of the events in a calendar application of the user device while the initial synchronization is still being performed;

populating an additional response with the remaining portion of the events up to the specified number of events, wherein the additional response is populated chronologically according to one of when the remaining portion of the events are scheduled to occur and when the remaining portion of the events were stored in the master repository; and transmitting the additional response from the master repository to the user device along with a sync token that identifies a completion status of the initial synchronization;

receiving a continuation sync request from the user device at the master repository, the continuation sync request including the user, the number of events to be transmitted per response, and the sync token; and performing a continued synchronization responsive to the continuation sync request by:

identifying, according to the sync token, unsynchronized events stored in the master repository;

populating a continuation response with the unsynchronized events up to the specified number of events;

updating the sync token to identify a current status of the continued synchronization based on the continuation response; and transmitting the continuation response and the updated sync token from the master repository to the user device.

17. The computer readable storage device of claim 16, wherein the initial sync request and the continuation sync request are non-windowed.

18. The computer readable storage device of claim 16, wherein the continuation response is populated with the unsynchronized events stored in the master repository chronologically according to when the unsynchronized events are scheduled to occur.

19. The computer readable storage device of claim 16, wherein the continuation response is one of a series of continuation responses transmitted to the user device for piecewise synchronization according to the up to the specified number of events.

* * * * *